US008644767B1

(12) United States Patent
Matsui (10) Patent No.: US 8,644,767 B1
(45) Date of Patent: Feb. 4, 2014

(54) ENHANCED SIGNAL WRAPAROUND MONITOR (75) Inventor: Gen Matsui, Bothell, WA (US)

(73) Assignee: The Boeing Company, Chicago, IL (US)

(*) Notice: Subject to any disclaimer, the term of this patent is extended or adjusted under 35 U.S.C. 154(b) by 23 days.

(21) Appl. No.: 13/440,972

(22) Filed: Apr. 5, 2012

(51) Int. Cl.
*H04B 7/00* (2006.01)

(52) U.S. Cl.
USPC .................................... 455/67.11; 455/226.1

(58) Field of Classification Search
USPC .......... 455/67.11, 67.13, 57.14, 115.1, 115.2, 455/226.1, 226.2, 226.4, 307
See application file for complete search history.

(56) References Cited

U.S. PATENT DOCUMENTS

| 7,570,923 | B2* | 8/2009 | Kiss et al. ............... 455/226.1 |
| 2006/0089104 | A1* | 4/2006 | Kaikkonen et al. ........ 455/67.13 |
| 2009/0075598 | A1* | 3/2009 | Pietraski et al. ........... 455/67.13 |

* cited by examiner

*Primary Examiner* — Thanh Le
(74) *Attorney, Agent, or Firm* — Ameh IP; Lowell Campbell; Elahe Toosi (57) ABSTRACT

A system and methods for wraparound signal monitoring are presented. An initial signal is transmitted through a signal path to provide a transmitted signal, and the transmitted signal is transmitted through an inverse signal path to provide an inverse signal. The inverse signal path comprises an inverse of the signal path. The transmitted signal is filtered to provide a filtered signal, and the filtered signal is transmitted through the inverse signal path to provide an inverse filtered signal. The inverse signal, the inverse filtered signal, and the initial signal are compared to provide a signal status.

20 Claims, 8 Drawing Sheets

ENHANCED SIGNAL WRAPAROUND MONITOR

FIELD

Embodiments of the present disclosure relate generally to signal processing. More particularly, embodiments of the present disclosure relate to signal error detection.

BACKGROUND

Signal wraparound monitor is a technique used to ensure the integrity of a signal path. An initial signal ("source signal") that goes into a signal path is compared against an inverse signal ("wraparound signal") that comes out of the inverse signal path, by returning the initial signal. In normal conditions, the two signals are expected to match exactly or within a tolerance, depending on a process in between. However, if any of the signals get corrupted, the monitor can detect the corrupting event by observing the difference between the two signals.

SUMMARY

A system and method for wraparound signal monitoring is disclosed. An initial signal is transmitted through a signal path to provide a transmitted signal, and the transmitted signal is transmitted through an inverse signal path to provide an inverse signal. The inverse signal path comprises an inverse of the signal path. The transmitted signal is filtered to provide a filtered signal, and the filtered signal is transmitted through the inverse signal path to provide an inverse filtered signal. The inverse signal, the inverse filtered signal, and the initial signal are compared to provide a signal status.

In this manner, a sampling rate associated with a conventional wraparound monitor required to provide adequate coverage may be reduced so that cost, throughput (e.g., data-bus throughput), weight, as well as architectural complexity can be reduced.

In an embodiment, a method for wraparound signal monitoring transmits an initial signal through a signal path to provide a transmitted signal, and transmits the transmitted signal through an inverse signal path to provide an inverse signal. The inverse signal path comprises an inverse of the signal path. The method further filters the transmitted signal to provide a filtered signal, and transmits the filtered signal through the inverse signal path to provide an inverse filtered signal. The method further compares the inverse signal, the inverse filtered signal, and the initial signal to provide a signal status.

In another embodiment, a system for wraparound signal monitoring comprises a signal path, a first inverse signal path, a filter, a second inverse signal path, and a wraparound signal monitor. The signal path transmits an initial signal to provide a transmitted signal. The first inverse signal path transmits the transmitted signal through an inverse signal path to provide an inverse signal. The first inverse signal path comprises an inverse of the signal path. The filter filters the transmitted signal to provide a filtered signal. The second inverse signal path transmits the filtered signal through an inverse signal path to provide an inverse filtered signal, the second inverse signal path comprises an inverse of the signal path. The wraparound signal monitor compares the inverse signal, the inverse filtered signal, and the initial signal to provide a signal status.

In a further embodiment, a computer readable storage medium comprises computer-executable instructions for wraparound signal monitoring. The method executed by the computer-executable instructions transmits an initial signal through a signal path to provide a transmitted signal, and transmits the transmitted signal through an inverse signal path to provide an inverse signal, the inverse signal path comprises an inverse of the signal path. The method executed by the computer-executable instructions also filters the transmitted signal to provide a filtered signal, and transmits the filtered signal through the inverse signal path to provide an inverse filtered signal. The method executed by the computer-executable instructions further compares the inverse signal, the inverse filtered signal, and the initial signal to provide a signal status.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to signal processing, data communication, electronic circuits, electronic devices, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, signal path integrity of an aircraft system. Embodiments of the disclosure, however, are not limited to such aircraft-system signal-path integrity applications, and the techniques described herein may also be utilized in other applications. For example but without limitation, embodiments may be applicable to signal path integrity of electronic systems of spacecraft, submarines, buses, houses, ships, trains, or other environment comprising signal paths.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
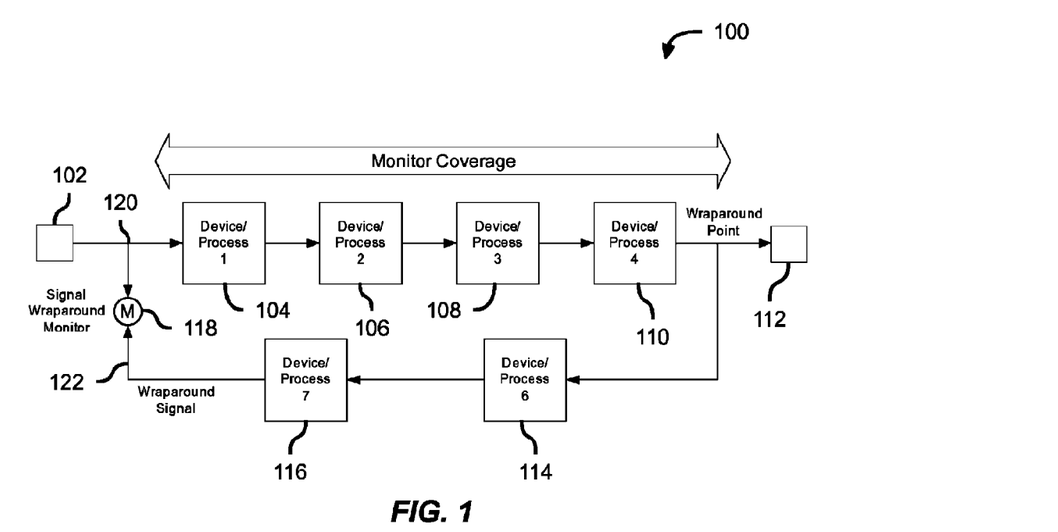
FIG. 1 is an illustration of an exemplary block diagram of a wraparound signal monitoring system.

FIG. 1 is an illustration of an exemplary block diagram of a wraparound signal monitoring system 100 (system 100). System 100 may comprise a signal source 102, a plurality of signal path devices/processes (1-4) 104/106/108/110, a controlled device 112, a plurality of inverse signal path devices/processes (7-6) 114/116, and a signal wraparound monitor 118.

The signal wraparound monitor 118 is a technique used to ensure integrity of the signal path 104/106/108/110 (forward path). As shown in a generic example in FIG. 1, an initial signal 120 ("source signal") that goes into the signal path 104/106/108/110 is compared at the signal wraparound monitor 118 against an inverse signal 122 ("wraparound signal") that comes out of the wraparound path/inverse signal path 114/116 (e.g., returning the initial signal 120). In normal conditions, the initial signal 120 and the inverse signal 122 are expected to substantially match, exactly or within a tolerance. However, if the initial signal 120 and/or the inverse signal 122 is corrupted, the monitor can detect the corrupting event by observing a difference between the initial signal 120 and the inverse signal 122.

In many cases, at least some of the path (both forward path and wraparound path) is discrete using discrete-time sampling. In such a system, a required sampling rate associated with the wraparound signal depends on a sensitivity of the controlled device 112 to short-duration signal corruption (e.g., a pulse). The sampling rate would need to be commensurate with a sensitivity of the system 100 to which the signal wraparound monitor 118 is applied. In some cases, the required sampling rate may significantly impact the system 100 that supports the signal wraparound monitor 118, in terms of cost, throughput, weight, as well as complexity of the architecture.

Figure 2:
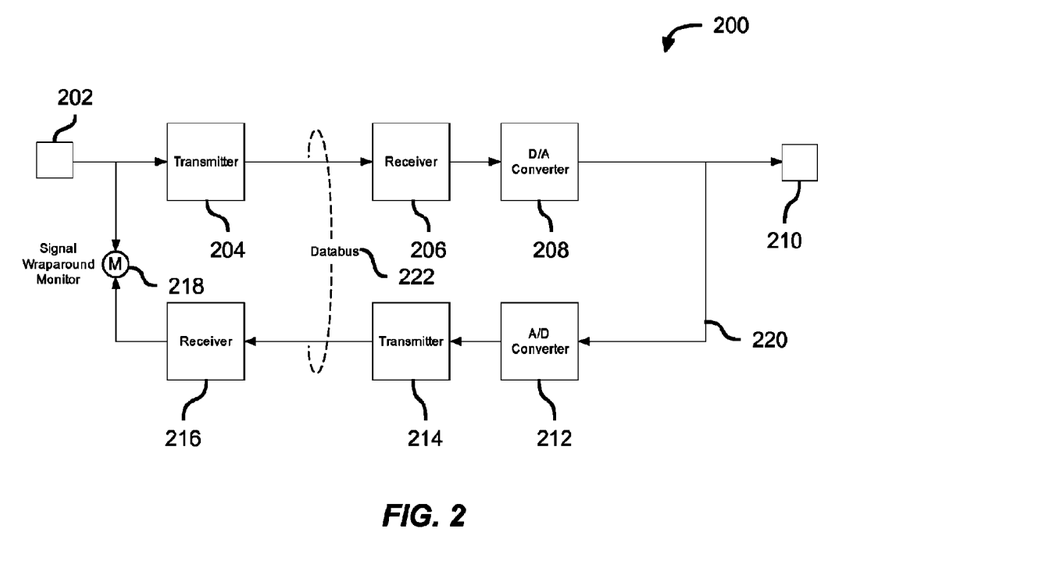
FIG. 2 is an illustration of an exemplary block diagram of a wraparound signal monitoring system.

FIG. 2 is an illustration of an exemplary block diagram of a wraparound signal monitoring system 200 (system 200). System 200 may comprise a signal source 202, a signal path transmitter 204, a signal path receiver 206, a signal path Digital to Analog (D/A) converter 208, a controlled device 210, an inverse signal path Analog to Digital (A/D) converter 212, an inverse signal path transmitter 214, an inverse signal path receiver 216, and a signal wraparound monitor 218. FIG. 2 shows an example of a monitoring scheme. In this example, the signal source 202 sends a signal to the signal path transmitter 204. Output of the signal path transmitter 204 is received by the signal path receiver 206 and then sent to the signal path D/A converter 208. An output 220 of the signal path D/A converter 208 is wrapped around by converting the output 220 back to a digital signal by the inverse signal path ND converter 212 and then transporting back the digital signal to the signal wraparound monitor 218 through the signal path transmitter 214 and via a data bus 222.

Figure 3:
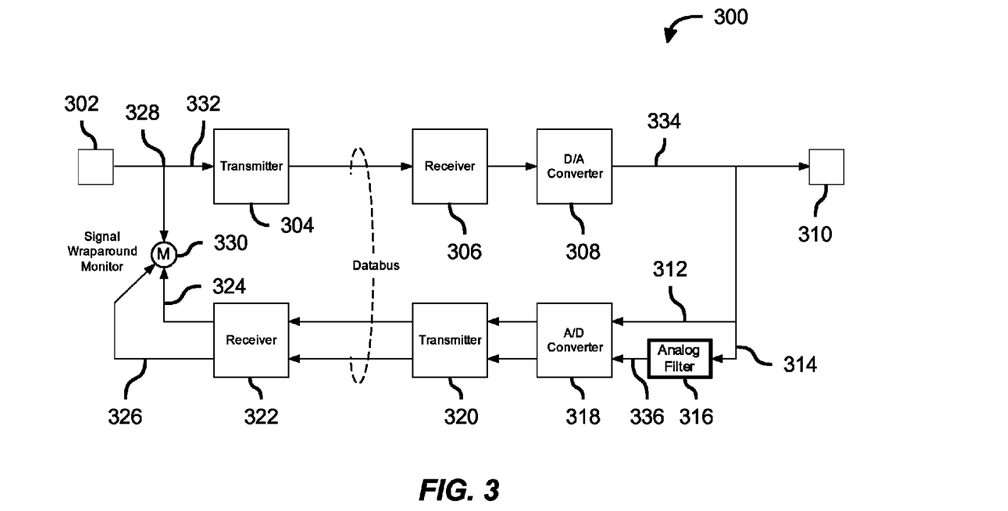
FIG. 3 is an illustration of an exemplary block diagram of a wraparound signal monitoring system according to an embodiment of the disclosure.

FIG. 3 is an illustration of an exemplary block diagram of a wraparound signal monitoring system 300 (system 300) according to an embodiment of the disclosure. System 300 may comprise a signal source 302, a signal path transmitter 304, a signal path receiver 306, a signal path D/A converter 308, a controlled device 310, an analog filter 316, an inverse signal path ND converter 318, an inverse signal path transmitter 320, an inverse signal path receiver 322, and a signal wraparound monitor 330. Embodiments of the disclosure add an element whose output is affected by its input for long enough duration to make it observable by the signal wraparound monitor 330. For instance, the element may comprise, for example but without limitation, a lag filter such as the analog filter 316, or other signal delay element. In this embodiment, in addition to a "straight" wraparound inverse signal path 312, a filtered wraparound inverse signal path 314 is added, and both are used in the signal wraparound monitor 330.

Figure 11:
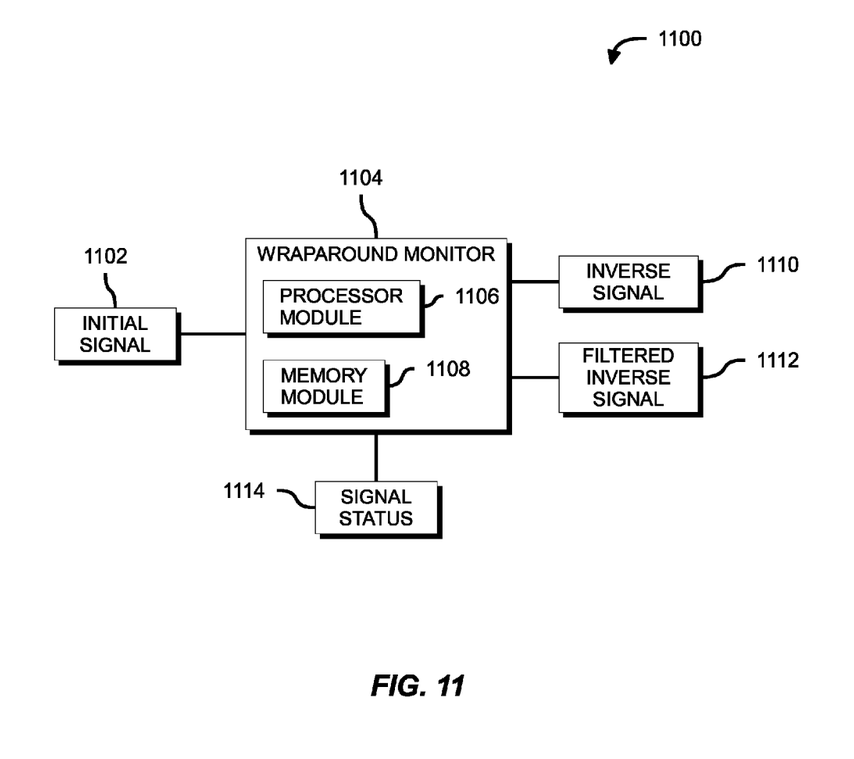
FIG. 11 is an illustration of an exemplary block diagram of a wraparound signal monitor according to an embodiment of the disclosure.

An initial signal 328 is transmitted through a signal path 332 comprising the signal path transmitter 304, the signal path receiver 306, the signal path D/A converter 308 to provide a transmitted signal 334. The transmitted signal 334 is transmitted through an inverse signal path 312 to provide an inverse signal 324; the inverse signal path 312 comprises an inverse of the signal path 332. The transmitted signal 334 is also filtered by the filter 316 to provide a filtered signal 336. The filtered signal 336 is transmitted through the filtered wraparound inverse signal path 314 to provide an inverse filtered signal 326. The inverse signal 324, the inverse filtered signal 326, and the initial signal 328 are compared at the signal wraparound monitor 330 to provide a signal status 1114 (FIG. 11).

Figure 4:
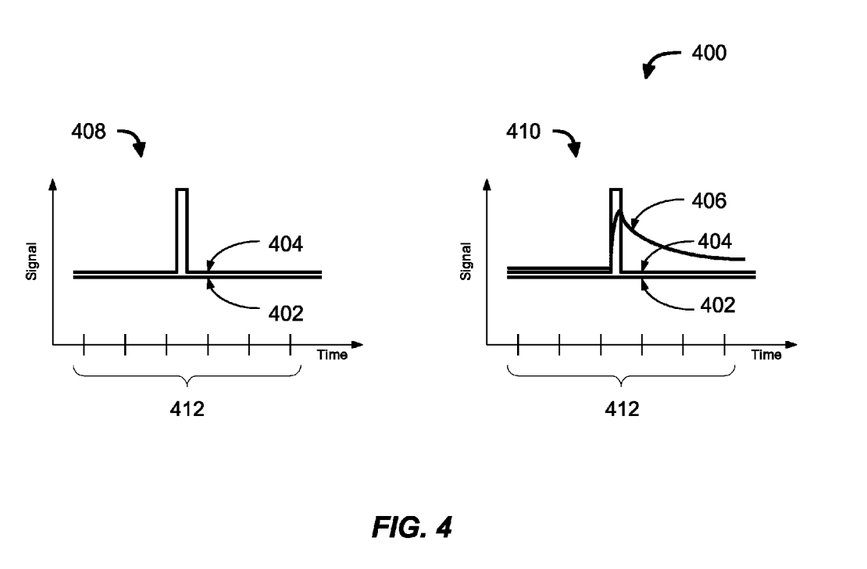
FIG. 4 is an illustration of a graph showing a wraparound signal and a graph showing a filtered wraparound signal according to an embodiment of the disclosure.

FIG. 4 is an illustration of a graph 408 showing a wraparound signal 404 and a graph 410 showing a filtered wraparound signal 406 according to an embodiment of the disclosure. FIG. 4 illustrates a principle of operation. An initial signal 402 is compared to the wraparound signal 404 and the filtered wraparound signal 406. The graph 408 shows a case in which a duration of a fault event is too short to be observable through a conventional "straight" wraparound, because the event occurs between two consecutive sampling timings represented by the tick marks on the time axis. However, the graph 410 shows that an effect of the fault event may be made observable by addition of the filtered wraparound signal 406.

Figure 5:
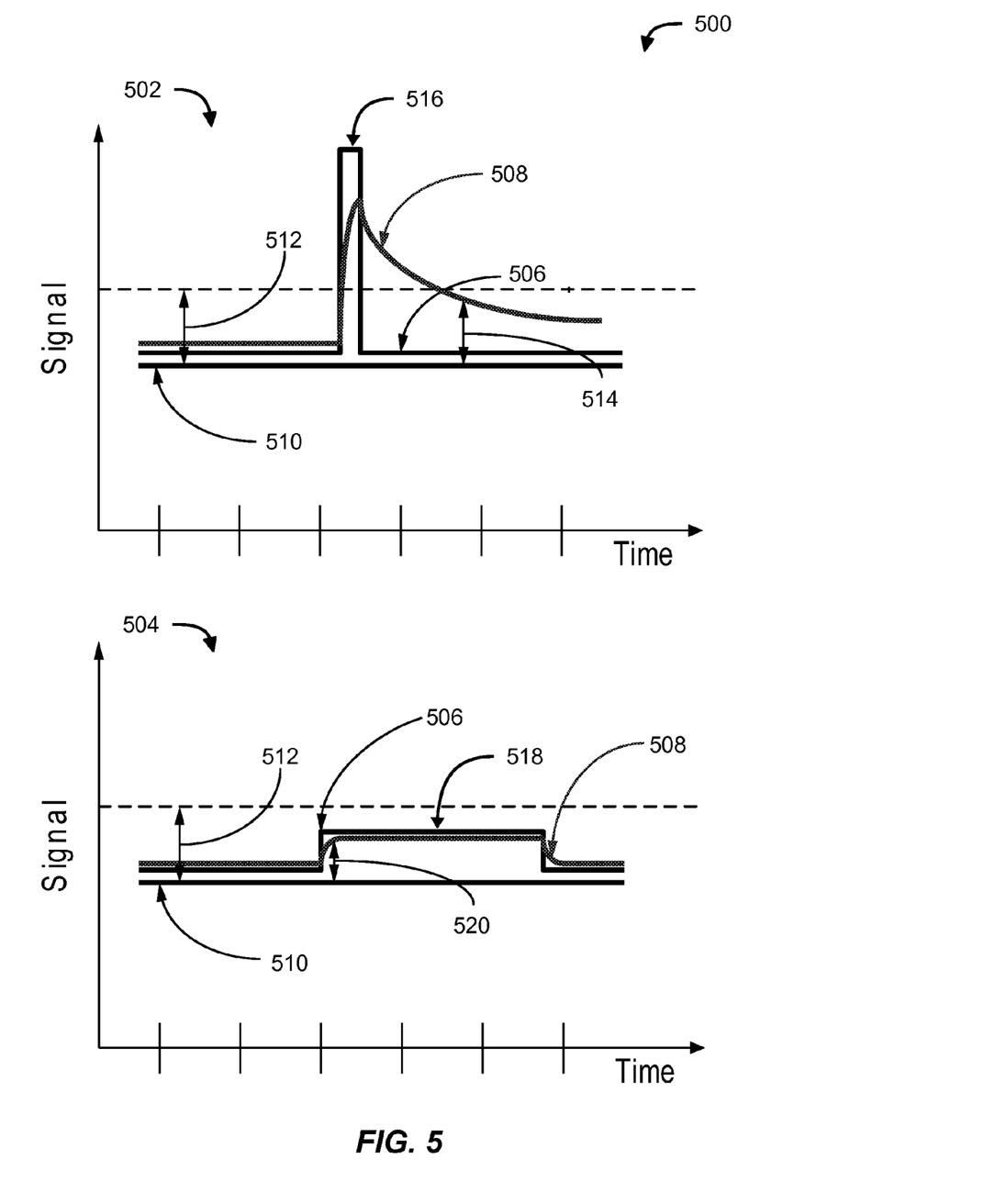
FIG. 5 is an illustration of graphs showing two types of errors to which a controlled device may be sensitive.

FIG. 5 is an illustration of graphs 502/504 showing two types of errors to which the controlled device 310 may be sensitive. The graph 502 illustrates a wraparound signal 506 comprising a short-duration high-amplitude error 516. The short-duration high-amplitude error 516 can be captured by comparing a difference 514 between an initial signal 510 and a filtered wraparound signal 508 to a threshold 512 during sampling times as discussed previously. The threshold 512 may be set relative to the initial signal 510. The graph 504 illustrates a wraparound signal 506 comprising a long-duration low-amplitude error 518. The long-duration low-amplitude error 518 may not be captured by a comparison because a difference 520 between an initial signal 510 and the filtered wraparound signal 508 does not exceed the threshold 512.

Figure 6:
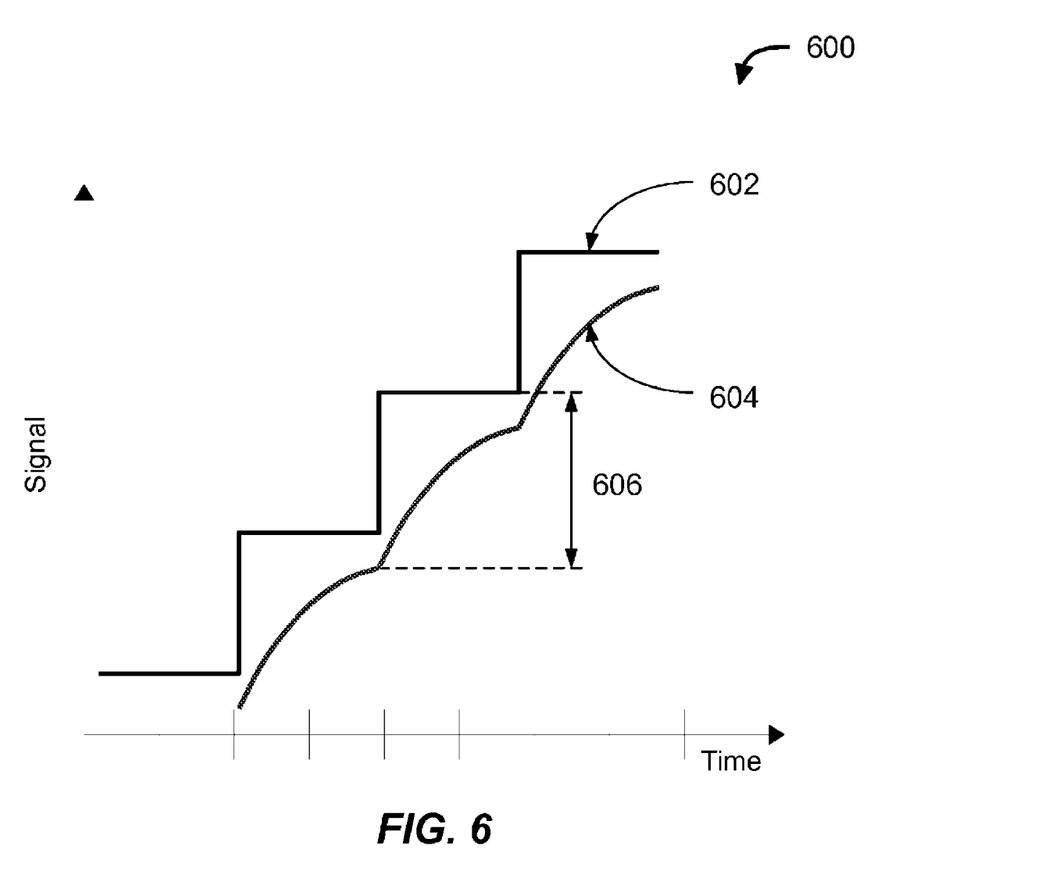
FIG. 6 is an illustration of a graph demonstrating limitations to adjusting a threshold to detect a low-amplitude error.

FIG. 6 is an illustration of a graph 600 demonstrating limitations to adjusting a threshold to detect a low-amplitude error such as the long-duration low-amplitude error 518. The threshold 512 may not be effective by simply being set tighter to detect the long-duration low-amplitude error 518. Because a filtered wraparound signal 604 (inverse filtered signal 336 in FIG. 3) lags behind the initial signal 602 (initial signal 328 in FIG. 3), a filtered wraparound signal threshold such as the threshold 512 to which a difference between the filtered wraparound signal 604 and the initial signal 602 is compared may not be set tighter than an expected maximum difference 606. Otherwise, the signal wraparound monitor 330 may trip erroneously, or "nuisance trip". When a sensitivity of the controlled device 310 (downstream system) is such that an error amplitude less than a minimum allowable filtered wraparound threshold needs to be detected, the comparison of the initial signal 602 to the wraparound signal 506 can provide a required coverage. For example, in FIG. 5 since the long-duration low-amplitude error 518 crosses a sampling time, a difference between the initial signal 510 and the wraparound signal 506 can be detected.

Figure 7:
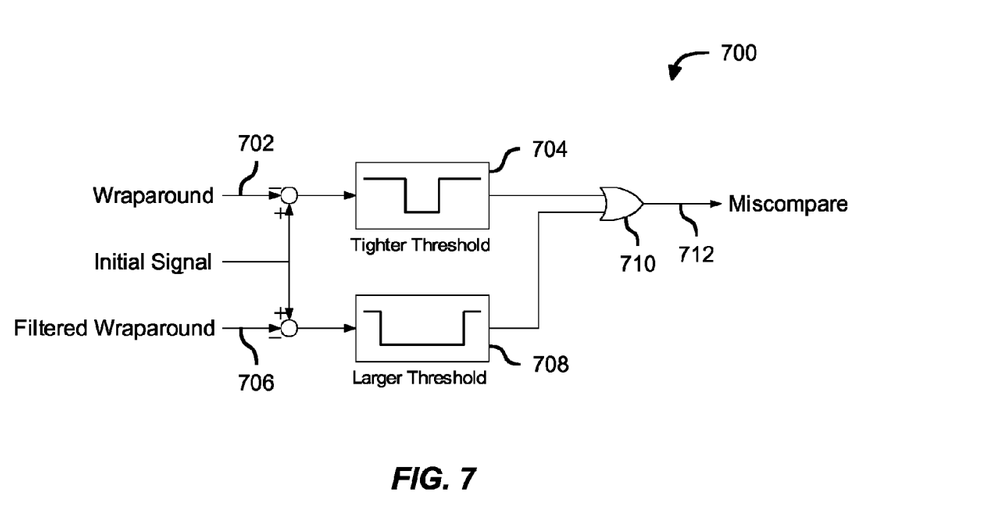
FIG. 7 is an illustration of an exemplary block diagram of a wraparound signal monitor according to an embodiment of the disclosure.

FIG. 7 is an illustration of an exemplary block diagram of a wraparound signal monitor 700 according to an embodiment of the disclosure. FIG. 7 shows an example of monitoring a straight wraparound signal 702 with a tight threshold 704 and a filtered wraparound signal 706 with a larger threshold 708 in parallel. A logical OR gate 710 may be used to detect a miscompare 712 indicating a signal status (e.g., the signal status 1114 in FIG. 11).

Figure 8:
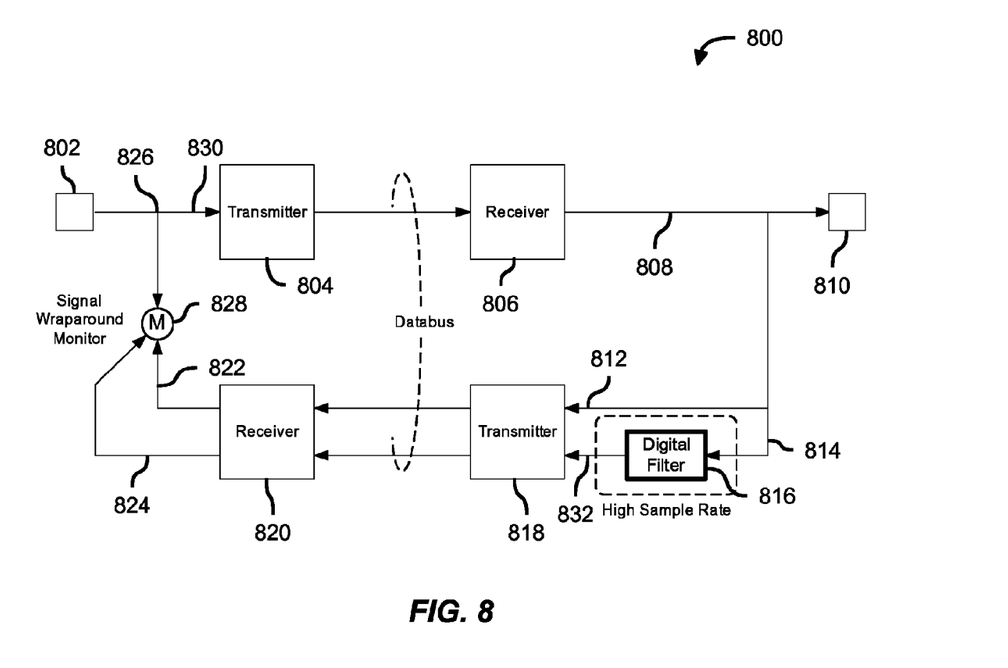
FIG. 8 is an illustration of an exemplary block diagram of a wraparound signal monitoring system according to an embodiment of the disclosure.

FIG. 8 is an illustration of an exemplary block diagram of a wraparound signal monitoring system 800 (system 800) according to an embodiment of the disclosure. System 800 may comprise a signal source 802, a signal path transmitter 804, a signal path receiver 806, a controlled device 810, a digital filter 816, an inverse signal path transmitter 818, an inverse signal path receiver 820, and a signal wraparound monitor 828. Analog implementation of a lag filter as the analog filter 316 was discussed above, but the lag filter may be implemented digitally. In this case, the digital filter 816 may need to be executed at a high-enough rate to capture a non-optimal event on a signal path 830, but a sampling rate for processes downstream of the digital filter 816 such as the inverse signal path transmitter 818 and the inverse signal path receiver 820 can be reduced in a substantially same manner as the analog filter 316.

An initial signal 826 is transmitted through the signal path 830 comprising the signal path transmitter 804 and the signal path receiver 806 to provide a transmitted signal 808. The transmitted signal 808 is transmitted through an inverse signal path 812 to provide an inverse signal 822. The inverse signal path 812 comprises an inverse of the signal path 830. The transmitted signal 808 is also filtered by the digital filter 816 to provide a filtered signal 832. The filtered signal 832 is transmitted through the inverse signal path 814 to provide an inverse filtered signal 824. The inverse signal 822, the inverse filtered signal 824, and the initial signal 826 are compared to provide the signal status 1114 (FIG. 11).

Figure 9:
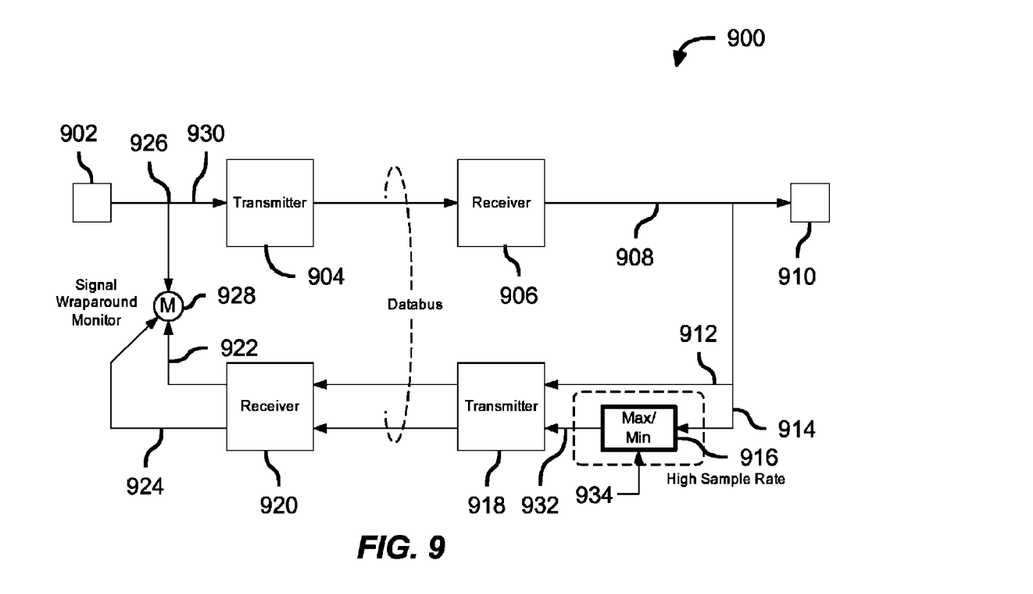
FIG. 9 is an illustration of an exemplary block diagram of a wraparound signal monitoring system according to an embodiment of the disclosure.

FIG. 9 is an illustration of an exemplary block diagram of a wraparound signal monitoring system 900 (system 900) according to an embodiment of the disclosure. System 900 may comprise a signal source 902, a signal path transmitter 904, a signal path receiver 906, a controlled device 910, a min/max filter 916, an inverse signal path transmitter 918, an inverse signal path receiver 920, and a signal wraparound monitor 928. In the above examples, use of a lag filter (e.g., the analog filter 316 and the digital filter 816) was discussed. However, other types of filters or elements can be conceived whose output is affected by its input for long enough duration to make it observable by the monitor. The additional element should elongate a visibility of the effect. The min/max filter 916 captures a minimum and a maximum of a transmitted signal 908 and outputs the minimum and the maximum. Min/max filter 916 and max/min filter 916 may be used interchangeably in this document. In this embodiment, a filtered signal 932 output from the min/max filter 916 is reset at a regular interval or as needed when an initial signal 926 changes. In some embodiments, the min/max filter 916 is reset by a reset control signal 934.

The initial signal 926 is transmitted through the signal path 930 comprising the signal path transmitter 904 and the signal path receiver 906 to provide a transmitted signal 908. The transmitted signal 908 is transmitted through an inverse signal path 912 to provide an inverse signal 922, the inverse signal path 912 an inverse of the signal path 930. The transmitted signal 908 is also filtered by the min/max filter 916 to provide the filtered signal 932. The filtered signal 932 is transmitted through the inverse signal path 914 to provide an inverse filtered signal 924. The inverse signal 922, the inverse filtered signal 924, and the initial signal 926 are compared to provide the signal status 1114 (FIG. 11).

Figure 10:
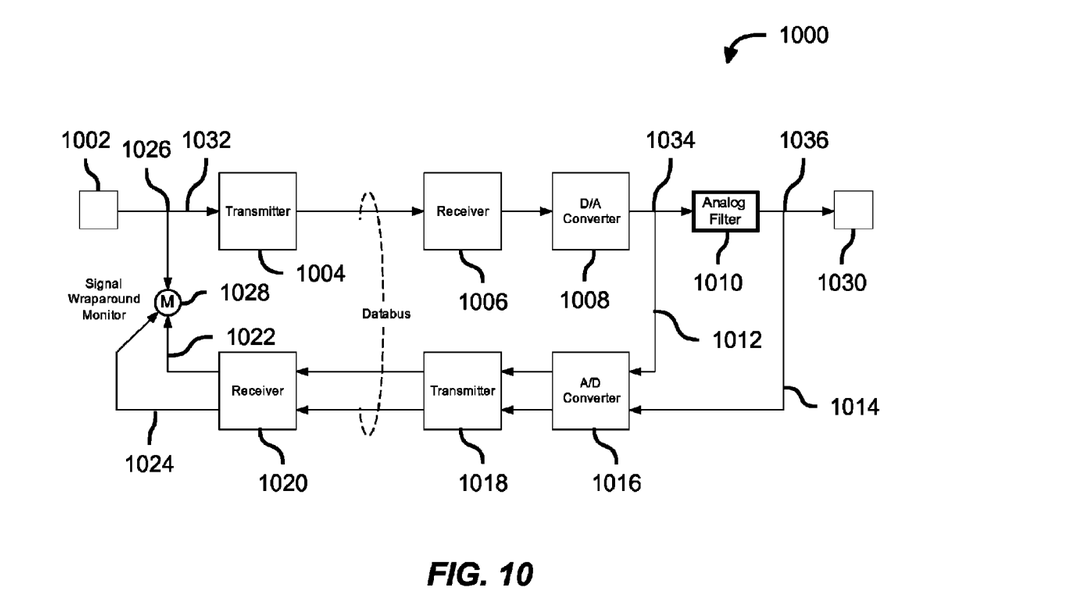
FIG. 10 is an illustration of an exemplary block diagram of a wraparound signal monitoring system according to an embodiment of the disclosure.

FIG. 10 is an illustration of an exemplary block diagram of a wraparound signal monitoring system 1000 (system 1000) according to an embodiment of the disclosure. System 1000 may comprise a signal source 1002, a signal path transmitter 1004, a signal path receiver 1006, a signal path D/A converter 1008, an analog filter 1010, a controlled device 1030, an inverse signal path A/D converter 1016, an inverse signal path transmitter 1018, an inverse signal path receiver 1020, and a signal wraparound monitor 1028. In this embodiment, a filter such the analog filter 1010 is used in a signal path 1032 (forward path). For example, there may be a filter required to smooth out a transmitted signal 1034 before passing a filtered signal 1014 to the controlled device 1030. In this case, the analog filter 1010 may be used in the signal path 1032 and wrap around the filtered signal 1014 for monitoring by the signal wraparound monitor 1028.

An initial signal 1026 is transmitted through the signal path 1032 comprising the signal path transmitter 1004, the signal path receiver 1006, and the signal path D/A converter 1008 to provide a transmitted signal 1034. The transmitted signal 1034 is also filtered by the analog filter 1010 to provide a filtered signal 1036 to the controlled device 1030 (external device). The transmitted signal 1034 is also transmitted through an inverse signal path 1012 to provide an inverse signal 1022. The filtered signal 1036 is also transmitted through the inverse signal path 1014 to provide an inverse filtered signal 1024. The inverse signal 1022, the inverse filtered signal 1024, and the initial signal 1026 are compared to provide the signal status 1114 (FIG. 11).

FIG. 11 is an illustration of an exemplary block diagram of a wraparound signal monitor system 1100 (system 1100) according to an embodiment of the disclosure. System 1100 may comprise an initial signal 1102, an inverse signal 1110, a filtered signal 1112, and a wraparound monitor 1104.

The wraparound monitor 1104 may comprise, for example but without limitation, a processor module 1106, a memory module 1108, or other module. The wraparound monitor 1104 may be implemented as, for example but without limitation, a part of an aircraft system, a centralized aircraft processor, a subsystem computing module devoted to the location-based device configuration system 1100, or other circuit or processor.

The processor module 1106 comprises processing logic that is configured to carry out the functions, techniques, and processing tasks associated with the operation of the system 1100. In particular, the processing logic is configured to support the system 1100 described herein. For example, the processor module 1106 may direct signal communication in the system 1100.

The processor module 1106 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 1108 may comprise a data storage area with memory formatted to support the operation of the system 1100. The memory module 1108 is configured to store, maintain, and provide data as needed to support the functionality of the system 1100. For example but without limitation, the memory module 1108 may store flight configuration data, threshold data, sampling rate, or other data.

In practical embodiments, the memory module 1108 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 1108 may be coupled to the processor module 1106 and configured to store, for example but without limitation, a database, and the like. Additionally, the memory module 1108 may represent a dynamically updating database containing a table for updating the database, and the like. The memory module 1108 may also store, a computer program that is executed by the processor module 1106, an operating system, an application program, tentative data used in executing a program, or other application.

The memory module 1108 may be coupled to the processor module 1106 such that the processor module 1106 can read information from and write information to the memory module 1108. For example, the processor module 1106 may access the memory module 1108 to access a sampling rate, a threshold, or other data.

As an example, the processor module 1106 and memory module 1108 may reside in respective application specific integrated circuits (ASICs). The memory module 1108 may also be integrated into the processor module 1106. In an embodiment, the memory module 1108 may comprise a cache memory for storing temporary variables or other intermediate information during execution of instructions to be executed by the processor module 1106.

Figure 12:
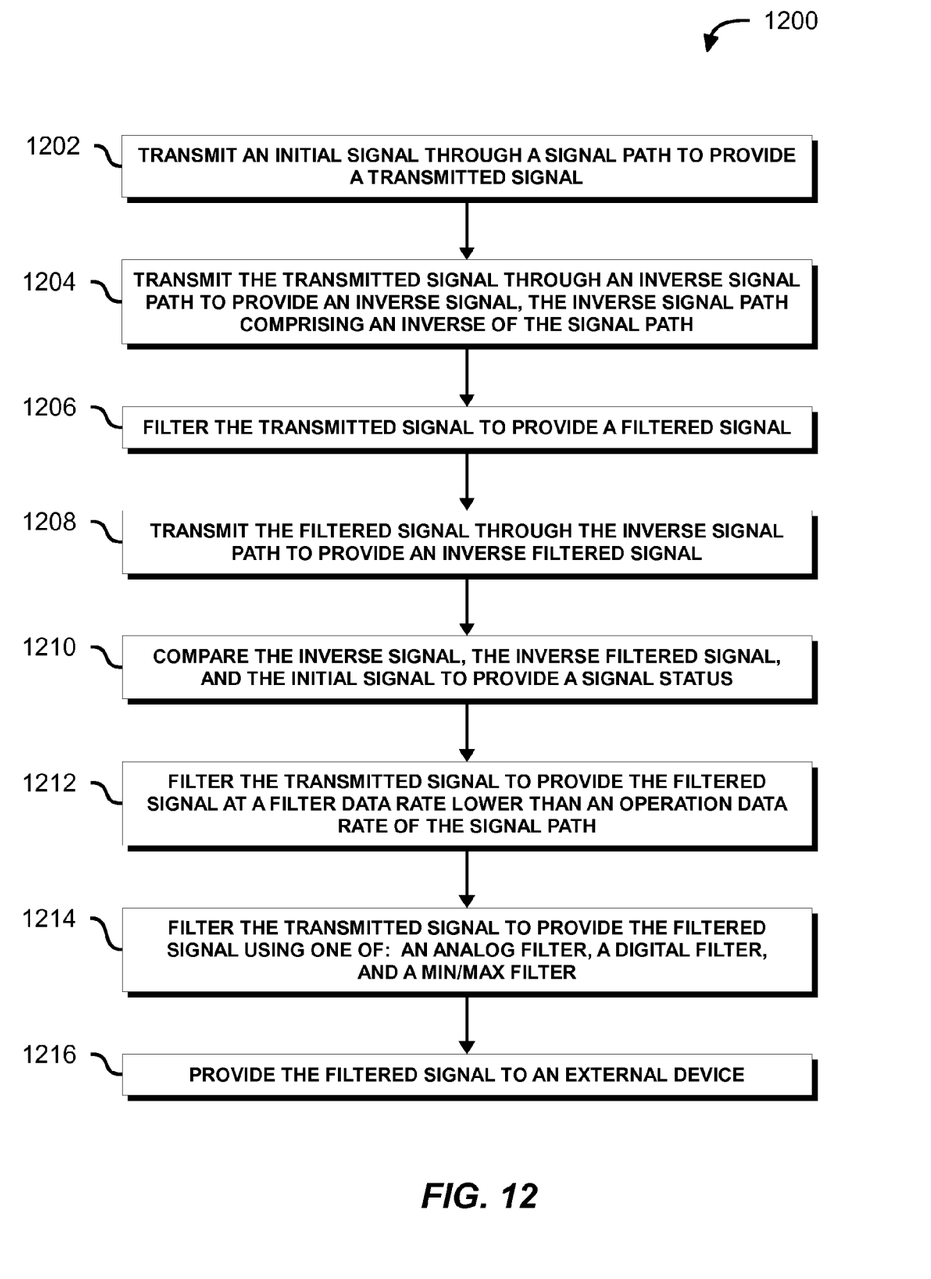
FIG. 12 is an illustration of an exemplary flowchart showing a process for wraparound signal monitoring according to an embodiment of the disclosure.

FIG. 12 is an illustration of an exemplary flowchart showing a process (process 1200) for wraparound signal monitoring according to an embodiment of the disclosure. The various tasks performed in connection with process 1200 may be performed mechanically, by software, hardware, firmware, computer-readable software, computer readable storage medium, or any combination thereof. It should be appreciated that process 1200 may include any number of additional or alternative tasks, the tasks shown in FIG. 12 need not be performed in the illustrated order, and the process 1200 may be incorporated into a more comprehensive procedure or process having additional functionality not described in detail herein.

For illustrative purposes, the following description of process 1200 may refer to elements mentioned above in connection with FIGS. 1-11. In practical embodiments, portions of the process 1200 may be performed by different elements of the systems 300-1100 such as: the signal source 302, the signal path transmitter 304, the signal path receiver 306, the signal path D/A converter 308, the controlled device 310, the analog filter 316, the inverse signal path ND converter 318, the inverse signal path transmitter 320, the inverse signal path receiver 322, the signal wraparound monitor 330, the digital filter 816, the max/min filter 916, etc. It should be appreciated that process 1200 may include any number of additional or alternative tasks, the tasks shown in FIG. 12 need not be performed in the illustrated order, and the process 1200 may be incorporated into a more comprehensive procedure or process having additional functionality not described in detail herein.

Process 1200 may begin by transmitting an initial signal such as the initial signal 328 through a signal path such as the signal path 332 to provide a transmitted signal such as the transmitted signal 334 (task 1202).

Process 1200 may continue by transmitting the transmitted signal 334 through an inverse signal path such as the inverse signal path 312 to provide an inverse signal such as the inverse signal 324, the inverse signal path 312 comprising an inverse of the signal path 332 (task 1204).

Process 1200 may continue by filtering the transmitted signal 334 to provide a filtered signal such as the filtered signal 336 (task 1206).

Process 1200 may continue by transmitting the filtered signal 336 through the inverse signal path 312 to provide an inverse filtered signal such as the inverse filtered signal 326 (task 1208).

Process 1200 may continue by comparing the inverse signal 324, the inverse filtered signal 336 and the initial signal 328 to provide a signal status such as the signal status 1114 (task 1210).

Process 1200 may continue by filtering the transmitted signal 334 to provide the filtered signal 326 at a filter data rate lower than an operation data rate of the signal path 332 (task 1212).

Process 1200 may continue by filtering the transmitted signal 334 to provide the filtered signal 326/832/932 using one of: an analog filter such as the filter 316, a digital filter such as the digital filter 816, and a min/max filter such as the min/max filter 916 (task 1214).

Process 1200 may continue by providing the filtered signal 326/832/932 to an external device such as the external device 310/810/910 (task 1216). The external device 310/810/910 may comprise, for example but without limitation, electronic systems of aircraft, spacecraft, submarines, buses, houses, ships, trains, or other environment comprising signal paths.

In this manner, a sampling rate associated with the conventional wraparound monitor required to provide adequate coverage may be reduced so that cost, throughput (e.g., data-bus throughput), weight, as well as architectural complexity can be reduced.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-11 depict example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 1106 to cause the processor module 1106 to perform specified operations. Such instructions, generally referred to as "computer program code" or "program code" (which may be grouped in the form of computer programs or other groupings), when executed, enable the system 1100.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for wraparound signal monitoring, the method comprising:
    transmitting an initial signal through a signal path to provide a transmitted signal;
    transmitting the transmitted signal through an inverse signal path to provide an inverse signal, the inverse signal path comprising an inverse of the signal path;
    filtering the transmitted signal to provide a filtered signal;
    transmitting the filtered signal through the inverse signal path to provide an inverse filtered signal; and
    comparing the inverse signal, the inverse filtered signal, and the initial signal to provide a signal status.

2. The method of claim 1, further comprising filtering the transmitted signal to provide the filtered signal at a filter data rate lower than an operation data rate of the signal path.

3. The method of claim 1, further comprising filtering the transmitted signal to provide the filtered signal using an analog filter.

4. The method of claim 1, further comprising filtering the transmitted signal to provide the filtered signal using a digital filter.

5. The method of claim 1, further comprising filtering the transmitted signal to provide the filtered signal using a min/max filter.

6. The method of claim 1, further comprising providing the filtered signal to an external device.

7. A system for wraparound signal monitoring comprising:
    a signal path operable to transmit an initial signal to provide a transmitted signal;
    a first inverse signal path operable to transmit the transmitted signal through an inverse signal path to provide an inverse signal, the first inverse signal path comprising an inverse of the signal path;
    a filter operable to filter the transmitted signal to provide a filtered signal; and
    a second inverse signal path operable to transmit the filtered signal through an inverse signal path to provide an inverse filtered signal, the second inverse signal path comprising an inverse of the signal path; and
    a wraparound signal monitor operable to compare the inverse signal, the inverse filtered signal, and the initial signal to provide a signal status.

8. The system of claim 7, wherein the filter is further operable to filter the transmitted signal to provide the filtered signal at a filter data rate lower than an operation data rate of the signal path.

9. The system of claim 7, wherein the filter comprises an analog filter.

10. The system of claim 7, wherein the filter comprises a digital filter.

11. The system of claim 7, wherein the filter comprises a min/max filter.

12. The system of claim 7, wherein the filter is coupled to an external device.

13. A non-transitory computer readable storage medium comprising computer-executable instructions for wraparound signal monitoring, a method executed by the computer-executable instructions comprising:

transmitting an initial signal through a signal path to provide a transmitted signal;

transmitting the transmitted signal through an inverse signal path to provide an inverse signal, the inverse signal path comprising an inverse of the signal path;

filtering the transmitted signal to provide a filtered signal;

transmitting the filtered signal through the inverse signal path to provide an inverse filtered signal; and comparing the inverse signal, the inverse filtered signal, and the initial signal to provide a signal status.

14. The non-transitory computer readable storage medium according to claim 13, the method executed by the computer-executable instructions further comprising filtering the transmitted signal to provide the filtered signal at a filter data rate lower than an operation data rate of the signal path.

15. The non-transitory computer readable storage medium according to claim 13, the method executed by the computer-executable instructions further comprising filtering the transmitted signal to provide the filtered signal using an analog filter.

16. The non-transitory computer readable storage medium according to claim 13, the method executed by the computer-executable instructions further comprising filtering the transmitted signal to provide the filtered signal using a digital filter.

17. The non-transitory computer readable storage medium according to claim 13, the method executed by the computer-executable instructions further comprising filtering the transmitted signal to provide the filtered signal using a min/max filter.

18. The non-transitory computer readable storage medium according to claim 17, the method executed by the computer-executable instructions further comprising resetting the min/max filter by a reset control signal.

19. The non-transitory computer readable storage medium according to claim 13, the method executed by the computer-executable instructions further comprising providing the filtered signal to an external device.

20. The non-transitory computer readable storage medium according to claim 13, the method executed by the computer-executable instructions further comprising filtering the transmitted signal by one of: an analog filter, a digital filter, and a min/max filter.

* * * * *